(12) United States Patent
Huignard et al.

(10) Patent No.: US 10,126,163 B2
(45) Date of Patent: Nov. 13, 2018

(54) OPTICAL FIBER SENSOR

(71) Applicants: THALES, Courbevoie (FR); CENTRE NATIONAL DE LA RECHERCHE SCIENTIFIQUE, Paris (FR); UNIVERSITE NICE SOPHIA-ANTIPOLIS, Nice (FR)

(72) Inventors: Jean-Pierre Huignard, Paris (FR); Umberto Bortolozzo, Juan les Pins (FR); Daniel Dolfi, Orsay (FR); Stéphanie Molin, Draveil (FR); Arnaud Peigne, Mougins (FR); Stefania Residori, Juan les Pins (FR)

(73) Assignees: THALES, Courbevoie (FR); CENTRE NATIONAL DE LA RECHERCHE SCIENTIFIQUE, Paris (FR); UNIVERSITE NICE SOPHIA-ANTIPOLIS, Nice (FR)

( * ) Notice: Subject to any disclaimer, the term of this patent is extended or adjusted under 35 U.S.C. 154(b) by 0 days.

(21) Appl. No.: 15/541,332

(22) PCT Filed: Jan. 8, 2016

(86) PCT No.: PCT/EP2016/050304
§ 371 (c)(1),
(2) Date: Jun. 30, 2017

(87) PCT Pub. No.: WO2016/110581
PCT Pub. Date: Jul. 14, 2016

(65) Prior Publication Data
US 2018/0003551 A1 Jan. 4, 2018

(30) Foreign Application Priority Data
Jan. 9, 2015 (FR) ...................... 15 00033

(51) Int. Cl.
*G01H 9/00* (2006.01)
*G01D 5/26* (2006.01)
*G01D 5/353* (2006.01)

(52) U.S. Cl.
CPC ............ *G01H 9/004* (2013.01); *G01D 5/268* (2013.01); *G01D 5/35303* (2013.01);
(Continued)

(58) Field of Classification Search
CPC .... G01H 9/004; G01D 5/268; G01D 5/35303; G01D 5/35364; G01D 5/35345; G01D 5/34316; G01D 5/35361
See application file for complete search history.

(56) References Cited

U.S. PATENT DOCUMENTS

| | | | | |
|---|---|---|---|---|
| 4,320,475 A | * | 3/1982 | Leclerc | ................. G02F 1/0134 367/140 |
| 4,536,861 A | * | 8/1985 | Graindorge | ............ G01H 9/004 356/477 |
| 2011/0320147 A1 | * | 12/2011 | Brady | .................... G01H 9/004 702/66 |

FOREIGN PATENT DOCUMENTS

FR  3 013 449 A1  5/2015

OTHER PUBLICATIONS

R. Bouffaron et al., "All-optical acoustic array for underwater surveillance," Proceedings of SPIE, vol. 8794, May 20, 2013, pp. 8794-36, XP055133779.

(Continued)

*Primary Examiner* — Dominic J Bologna
(74) *Attorney, Agent, or Firm* — Baker & Hostetler LLP

(57) ABSTRACT

A fiber optic sensor for detecting an excitation in proximity to a fiber optic assembly, the excitation inducing a modulation of the phase of an optical signal propagating in the fiber optic assembly, the sensor comprises: a laser assembly emitting at least one laser beam; a fiber optic assembly; an optical system configured to: inject at least one portion of the laser beam; generate at least one laser signal beam issued from the laser beam injected into and propagated in the fiber assembly; generate at least one reference beam from the (Continued)

laser beam or the signal beam; produce at least one interference zone corresponding to the interference between a portion of the reference beam and a portion of the interference signal beam corresponding to the interference between a portion of the reference beam and a portion of the signal beam; a digital holography assembly comprising: a liquid-crystal spatial light modulator; a video camera configured to receive the interference zone and to transcribe it electrically to the liquid-crystal spatial light modulator in order to create thereon a phase hologram corresponding thereto; at least one optical detector configured to detect an output optical signal beam.

18 Claims, 10 Drawing Sheets

(52) U.S. Cl.
CPC ..... *G01D 5/35364* (2013.01); *G01D 5/35316* (2013.01); *G01D 5/35345* (2013.01); *G01D 5/35361* (2013.01)

(56) References Cited

OTHER PUBLICATIONS

U. Bortolozzo et al., "Beam coupling in photorefractive liquid crystal light valves; Photorefractive liquid crystal light valves," Journal of Physics D, vol. 41, No. 22, pp. 224007, Nov. 21, 2008, XP020141029.

J. W. Goodman et al., "Digital image formation from electronically detected holograms," Applied Physics Letters, vol. 11, No. 77, 1967.

U. Shnars et al., Digital Holography, (Springer Ed. 2005).

F. Verpillat et al., "Digital holography at shot noise level," IEEE/OSA Journal of Display Technology, Jun. 7, 2012, pp. 1-10.

C. Bellanger et al., "Coherent fiber combining by digital holography," Optics Letters, vol. 33, No. 24, Dec. 15, 2008, pp. 2937-2939.

M. Paurisse et al., "Phase and amplitude control of a multimode LMA fiber beam by use of digital holography," Optics Express, vol. 17, No. 15, Jul. 20, 2009, pp. 13000-13008.

M. Cui et al., "Implementation of a digital optical phase conjugation system and its application to study the robustness of turbidity suppression by phase conjugation," Optics Express, vol. 18, No. 4, Feb. 15, 2010, pp. 3444-3455.

I. Papadopoulos et al., "Focusing and scanning light through a multimode optical fiber using digital phase conjugation," Optics Express, vol. 20, No. 10, May 7, 2012, pp. 10583-10590.

I. Papadopoulos et al., "Optical resolution photoacoustic microscopy by use of multimode fiber," Appl Phys Lett, vol. 102, 2013, pp. 211106.

I. Papadopoulos et al., "High resolution lensless endoscope based on digital scanning through a multimode optical fiber," Biomedical Optics Express, vol. 4, No. 2, Feb. 1, 2013, pp. 260-270.

\* cited by examiner

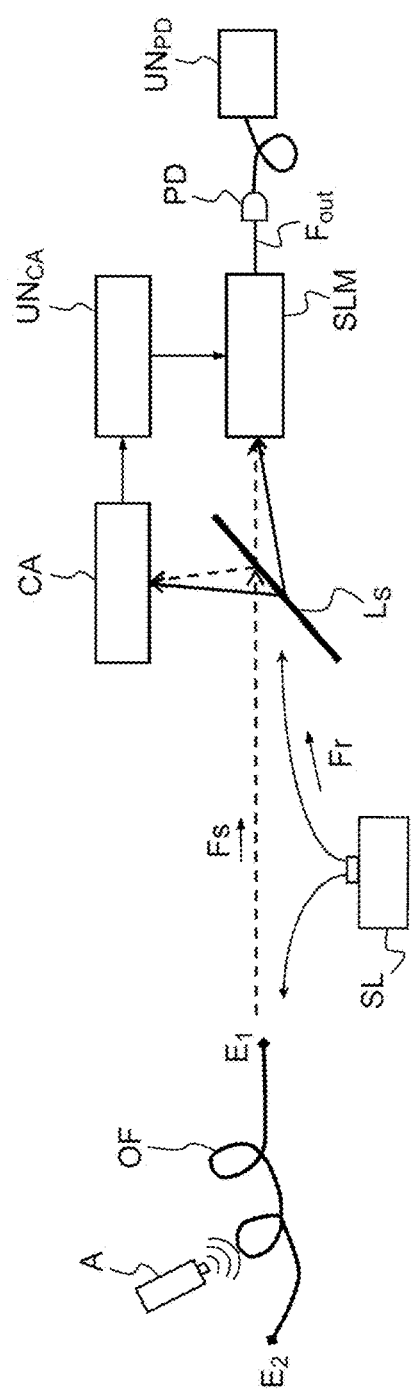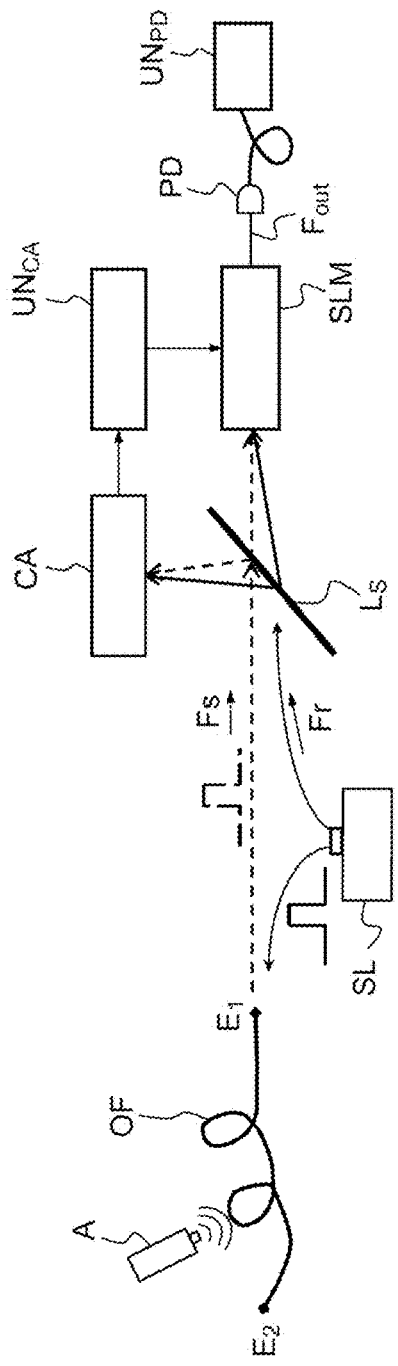

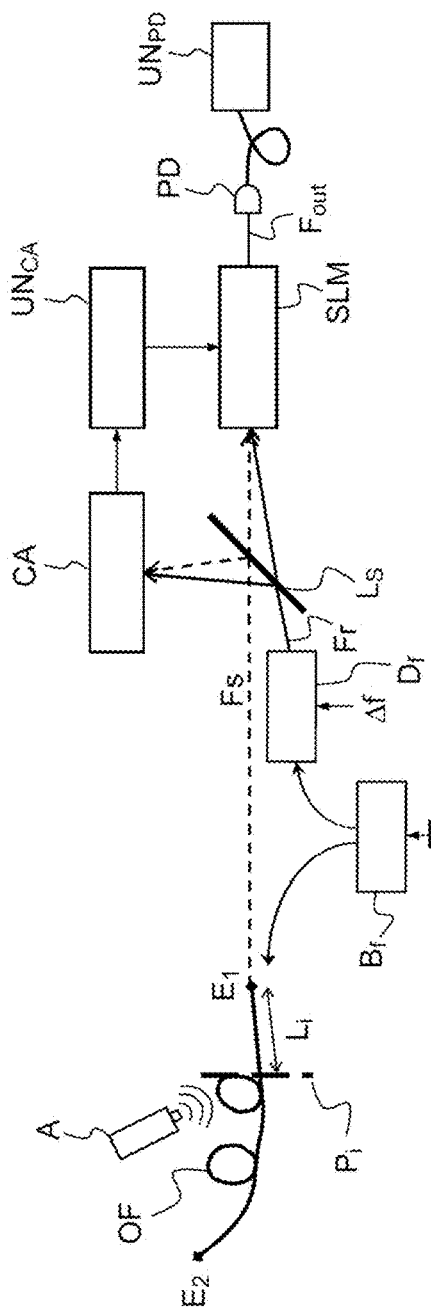
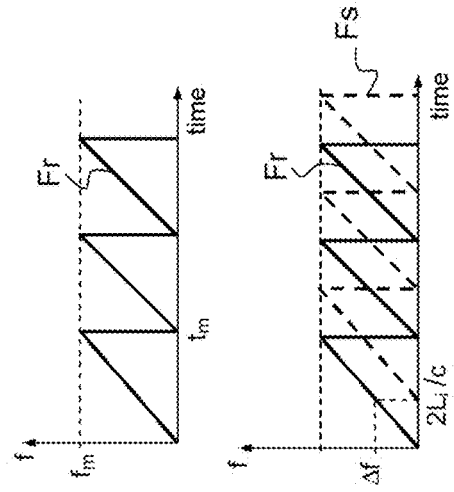
FIG.8a
FIG.8b

OPTICAL FIBER SENSOR

CROSS-REFERENCE TO RELATED APPLICATIONS

This application is a National Stage of International patent application PCT/EP2016/050304, filed on Jan. 8, 2016, which claims priority to foreign French patent application No. FR 1500033, filed on Jan. 9, 2015, the disclosures of which are incorporated by reference in their entirety.

FIELD OF THE INVENTION

The field of the invention is that of fiber optic sensors. More precisely, it relates to sensors able to detect an excitation in proximity to the fiber, and also able to locate this excitation along the fiber in a noisy environment.

BACKGROUND

This type of sensor has many applications as a pressure sensor in particular, allowing, by detection of modulation of the phase of an optical wave, environmental variations to be detected. One of the fields of application in which this type of detection is particularly of interest is underwater detection.

The underwater detection of soundwaves is of fundamental importance for coastal surveillance and certain military applications (for example detection/identification of submarines and surface vessels, the detection of divers or drones, etc.) and for civil applications (bioacoustic applications, monitoring of underwater seismic activity, detection of noise in the environment, etc.). To this end, fiber optic sensors are widely used both for their sensitivity and their compactness. The most sensitive are based on active (laser) or passive Bragg gratings, coupled to a mechanical transducer that converts the radial pressure of the acoustic wave into elongation of the fiber leading to a change in phase or optical wavelength. Distributed feedback fiber laser (DFB-FL) sensors are capable of detecting picostrains i.e. relative variations of $-\Delta L/L \sim 10^{-12}$, as described in the article "All-optical acoustic array for underwater surveillance", R. Bouffaron et al., PROCEEDINGS OF SPIE, volume 8794, paper 8794-36, Fifth European Workshop on Optical Fibre Sensors, Krakow 2013.

However, sensors and systems based on Bragg gratings are intrinsically sensitive to variations in the environment (typically temperature and static pressure variations), this placing large constraints on the design of this type of sensor and/or system.

Furthermore, to detect the associated optical phase modulation, precise interferometric measurements must be carried out, which are often a limitation on practical implementation of such systems, in particular when the detection must be executed in a fluctuating environment. Specifically, in this case, servocontrol mechanisms that are often onerous must be implemented in conventional interferometers to maintain quadrature, i.e. the optimal detection condition that allows the sensitivity of the sensor to be maximized.

To meet the needs of this type of application, requiring extreme sensitivities to the quantity to be measured and a relative insensitivity to environmental interference impacting the reading system, the Applicants have proposed in patent application FR 1302640 to use the high phase-change sensitivity delivered by the adaptive holography obtained by mixing two waves in a liquid-crystal light valve (LCLV), this type of valve being known in the prior art for its capacity to produce holograms by converting the intensity variation of an interference pattern into a variation in the index of the liquid crystal, thus inducing an optical phase variation. Typically, the LCLV comprises a thin layer of liquid crystal LC, typically of a thickness comprised between 10 and 200 µm, this layer being placed between two substrates, one of the substrates comprising a photoconductor PC able to convert the light received at N emission wavelengths $\lambda i$ into charge. For example, the layer of liquid crystals is located between a glass substrate and a substrate made of a photoconductor crystal, for example a crystal of BSO, that is sensitive to blue/green wavelengths, electrodes being deposited on the substrates.

Apart from its sensitivity, the passband of this detecting device allows slow fluctuations to be filtered and a sensor that is insensitive to variations in environmental conditions to be produced. In addition, this detecting device is coupled to a multimode fiber optic sensor, which is more sensitive to elongation than a single-mode fiber, and which therefore allows the sensing portion to be simplified and the transducer to even be made redundant.

Nevertheless, this solution has a drawback insofar as the heart of the interferometer is a liquid-crystal light valve that prevents independent optimization of the writing and reading of the hologram (the latter for example being adapted to the working wavelength) and insertion of a step of processing the signal in the interferometer.

To mitigate the aforementioned drawbacks, the Applicants propose a new fiber optic sensor using digital holography, replacing and thus disassociating the liquid-crystal valve with a video camera and a liquid-crystal spatial light modulator.

SUMMARY OF THE INVENTION

More precisely, one subject of the present invention is a fiber optic sensor for detecting an excitation in proximity to a fiber optic assembly, said excitation inducing a modulation of the phase of an optical signal propagating in said fiber optic assembly, said sensor comprising:
a laser assembly of at least one laser, said laser assembly being configured to emit at least one laser beam;
a fiber optic assembly having a first end and a second end;
an optical system configured to:
  inject via said first or said second end, at least one portion of said laser beam;
  receive via said first end, at least one signal beam issued from the portion of the laser beam injected into and propagated in said fiber assembly;
  generate at least one reference beam from said laser beam or said signal beam;
  produce at least one interference zone corresponding to the interference between a portion of the reference beam and a portion of the signal beam;
a digital holography assembly comprising:
  a liquid-crystal spatial light modulator configured to receive a portion of the signal beam and a portion of the reference beam;
  a video camera configured to receive said interference zone generating an interference pattern, said interference pattern being addressed electrically to said liquid-crystal spatial light modulator in order to create thereon a phase hologram corresponding thereto;
at least one optical detector configured to detect an output optical signal beam resulting from:

the diffraction of said portion of the signal beam and/or said portion of the reference beam received by the hologram inscribed in said liquid-crystal spatial light modulator and the transmission of said portion of the reference beam and/or said portion of the signal beam transmitted by said liquid-crystal spatial light modulator;

a processing unit, connected to the output of said optical detector, for processing said output optical signal beam, allowing information relative to said excitation to be extracted.

According to one variant of the invention, the fiber assembly is multimode, allowing the sensitivity to strain to be increased.

According to variants of the invention, the fiber optic sensor comprises first means, possibly a first acousto-optical modulator, for generating optical pulses from said laser.

According to the present invention, use of an adaptive interferometer allows both a complex wavefront issued from the fiber optic assembly to be demodulated and low-frequency environmental interference to be filtered. The use of a video camera allows the interference pattern to be detected, and the liquid-crystal spatial light modulator allows the phase to be read.

According to one variant of the invention, provision is made for a beam splitter to split the signal beam and the reference beam into two portions, a first portion of said beams being directed to said video camera, the second portion of said beams being directed to the liquid-crystal spatial light modulator.

The fiber optic sensor may advantageously include a processing unit, for processing on output from said video camera said interference pattern and for addressing it to said liquid-crystal spatial light modulator. The processing carried out may typically be spatial and/or temporal filtering. Specifically, according to the invention, digital coding of the phase allows both the reading and writing of the phase grating to be independently optimized and a step of processing the signal to be inserted.

According to variants of the invention, the signal beam received by said first end is issued from a beam inserted at said second end and propagated in transmission in said fiber optic assembly.

According to variants of the invention, the signal beam received by said first end is issued from a beam inserted at said first end and backscattered in said fiber optic assembly.

According to variants of the invention, the liquid-crystal spatial light modulator operates in reflection.

Another subject of the invention is a fiber optic sensor operating in backscatter and advantageously including means allowing said excitation to be located.

According to variants, a first portion of the laser beam is temporally modulated before being inserted into the fiber optic assembly, a second portion of the laser beam forming the reference laser beam without being temporally modulated, the sequential arrival of the pulses allowing the location of said excitation level with the fiber optic assembly. Since the speed v of propagation of the light wave in the optical fiber is known, measuring the duration dt of a round trip of a pulse makes it possible to determine at what distance Li into the fiber, referenced from the end $E_i$, the latter was backscattered: $2 \times Li = v \times dt$.

According to variants of the invention, the reference beam is generated from said signal beam output from said first end and comprises means for creating a path difference in said reference beam.

According to variants of the invention, the fiber optic sensor comprises at least:

a circulator positioned:
at the output of said optical assembly comprising at least one laser;
at the input of the fiber optic assembly;
at the input of said liquid-crystal spatial light modulator;
a coupler located at the output of said fiber optic assembly for creating two optical channels carrying output optical pulses;
means for delaying said output pulses of said fiber optic assembly in one of said two channels so as to create a signal channel carrying signal optical pulses and a reference channel carrying reference optical pulses in order to generate said interference zones on said spatial light modulator.

According to variants of the invention, the sensor furthermore includes:

second means, possibly a second acousto-optical modulator located at the output of the circulator and at the input of the coupler allowing windows of duration $2\Delta L/c$, where c is the speed of light in free space and $\Delta L/2$ is the length of a sensing zone defined between a position $A_i$ and a position $B_i$ in said fiber optic assembly and referenced from said first end, to be selected in order to let interfere only backscattered waves originating from a sensing zone of said fiber at the same time;

means for delaying said output pulses introducing an additional length to be traced $\Delta L$;

the pulses being separated by a duration $t_R$, such that $t_R > 2L/c$, the duration of said pulses $t_p$ being $t_p > \Delta L/c$ and $t_R > t_{off}$ where $t_{off}$ is the response time of the liquid crystals.

According to variants of the invention, the sensor furthermore comprises:

what is called a writing laser assembly comprising at least one laser emitting a series of what are called writing pulses at a pump frequency $\omega_p$ and a laser beam emitting a series of what are called writing pulses at a signal frequency $\omega_s$ that is different from the frequency $\omega_p$;

the optical system being configured:
to inject via said first end said series of writing pulses at the frequencies ωp and ωs, inscribing at least one Brillouin grating element in said optical fiber; and
to inject said series of pulses issued from said optical assembly including at least one laser emitting at a wavelength λs corresponding to a read laser beam at said signal frequency ωs;
the position $Z_r$ at which said Brillouin grating element is written being referenced with respect to the second end of said fiber and being regulated by the time shift between two writing pulses at the frequencies $\omega_p$ and $\omega_s$.

According to variants of the invention, the writing laser assembly comprises:

said laser emitting a laser beam;
means for dividing said beam into two channels;
means for shifting the pump frequency $\omega_p$ to a signal frequency $\omega_s$ in one of the channels;
means for generating pulses in the two frequency-shifted optical channels, possibly acousto-optical modulators.

According to variants of the invention, said optical system is configured so that said reference beam or said reference pulses interfere, on being input into said liquid-crystal modulator without having been injected into said fiber optic assembly, with said signal optical pulses ($I_{psiS}$) issued from said optical pulses injected into then propagated in said fiber.

According to variants of the invention, said optical system is configured so that said reference beam or said reference pulses interfere, on being input into said liquid-crystal modulator after having been injected into said fiber optic assembly, with said signal optical pulses issued from said optical pulses injected into then propagated in said fiber.

According to variants of the invention, the fiber optic sensor for locating an excitation in proximity to a fiber optic assembly operates in reflection and comprises:

a laser assembly configured to emit N laser beams Fi indexed i with i>1 of respective wavelength λi;

a fiber optic assembly including N successive segments indexed i, each segment comprising a device Mi for selectively reflecting an associated emission wavelength λi, the indices being referenced with respect to one end of said fiber optic assembly;

the optical system generating N reference beams Fri indexed i of emission wavelength λi from a laser beam Fi and producing N interference zones indexed i, each zone corresponding to the interference between a reference beam Fri and a signal beam Fsi of same emission wavelength λi;

at least one optical detector configured to detect N output optical signals $F_{out}i$ indexed i and respectively diffracted by said N holograms;

a processing unit suitable for identifying the segment of said fiber optic assembly located in proximity to said excitation to be located, from the N detected output optical signals $F_{out}i$.

According to variants of the invention, the fiber optic sensor for locating an excitation in proximity to a fiber optic assembly includes:

a laser assembly emitting a continuous-wave laser beam at a frequency f;

means for performing a periodic frequency scan of said frequency f in a frequency band [0, $f_m$] so as to code backscattering planes Pi corresponding to lengths Li referenced with respect to one end of said fiber optic assembly;

means for obtaining a shift Δf in the frequency of the reference laser beam so as to inscribe a hologram in said liquid-crystal spatial light modulator when the frequency of the reference beam coincides with the frequency of the signal laser beam;

a processing unit suitable for identifying the position of a backscattering plane Pi referenced with respect to one end of said fiber optic assembly.

BRIEF DESCRIPTION OF THE DRAWINGS

The invention will be better understood and other advantages will become apparent on reading the following non-limiting description, and by virtue of the appended figures, in which:

FIG. 4 schematically shows the principle of the invention in one variant fiber optic sensor operating in backscatter;

FIG. 5 schematically shows the principle of the invention in one variant fiber optic sensor for locating an excitation in proximity to a fiber optic assembly operating in backscatter with a temporally modulated signal beam;

FIGS. 8a and 8b schematically show the principle of the invention in one variant fiber optic sensor for locating an excitation in proximity to a fiber optic assembly operating in backscatter and with a frequency-scanned laser beam;

DETAILED DESCRIPTION

Figure 1:
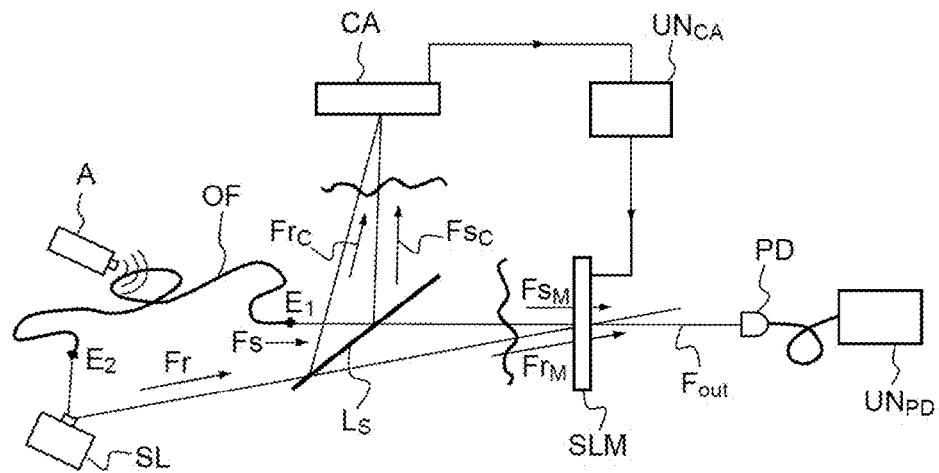
FIG. 1 schematically shows the principle of the invention in one variant fiber optic sensor operating in transmission.

The fiber optic sensor of the present invention is able to locate an excitation in proximity to a fiber optic assembly. The excitation that the sensor detects is such that it induces a modulation of the phase amplitude Δϕ of an optical signal propagating in the fiber optic assembly. The excitation for example corresponds to a pressure variation, in air (microphone type sensor) or in water (hydrophone type sensor) typically at a frequency higher than a few Hz and will be referenced A in the rest of the present description.

Generally, the fiber optic sensor of the present invention uses digital holography.

Digital holography is in particular described in the article by J. W. Goodman and R. W. Laurence, "Digital image formation from electronically detected holograms", Appl Phys Lett 11, 77 (1967) and is a technology that is currently being developed in industry and scientific instrumentation, and that has various applications in metrology, nondestructive testing and probing techniques, microscopy and 3-D imaging as described in the article by U. Shnars and W. Juptner, Digital holography (Springer Ed. 2005). Even with very small signal intensities, photonic noise limited image reconstruction has been demonstrated, as described in the article by M. Gross and M. Atlan, "Digital holography at shot noise level", Opt Lett. 32, 909 (2007). These recent developments are related to the availability on the market of video cameras that provide high resolutions, both in the visible and in the near-infrared, and of CCD and CMOS matrix array detectors with pixel sizes of the order of one micron. Another important aspect is the very high computational power currently available, allowing large images to be produced and quite complex interferograms to be reconstructed.

A new digital holography approach was introduced very recently for real-time phase conjugation of a segmented wavefront and for the demonstration of the coherent combination of fiber lasers as described in the article by C. Bellanger, A. Brignon, J. Colineau and J. P. Huignard, "Coherent fiber combining by digital holography", Opt Lett. 33, 2937 (2008). In this approach, the digital holography system consists of a CCD detecting matrix array that controls a liquid-crystal (LC) spatial light modulator (SLM).

Apart from the coherent combination of fiber lasers, this configuration has also been used to demonstrate phase conjugation in a multimode fiber, in highly scattering media and for focusing and scanning through a multimode fiber with the aim of correcting phase shifts undergone by an optical fiber as described in the articles by M. Paurisse, M. Hanna, F. Druon, P. Georges, C. Bellanger, A. Brignon and J. P. Huignard, "Phase and amplitude control of a multimode LMA fiber beam by use of digital holography", Opt Express 17, 13000 (2009), or by M. Cui and C. Yang, "Implementation of a digital optical phase conjugation system and its application to study the robustness of turbidity suppression by phase conjugation", Opt Express, 18, 3444 (2010) or by I. Papadopoulos, S. Farahi, D. Psaltis, and C. Moser, "Focussing and scanning light through a multimode optical fiber using digital phase conjugation", Opt Express. 20, 10583 (2012) or by I. Papadopoulos, O. Simandoux, S. Farahi, J. P. Huignard, E. Bossy, D. Psaltis and C. Moser, "Optical resolution photoacoustic microscopy by use of multimode fiber", Appl Phys Lett, 102, 211106 (2013) or indeed by I. Papadopoulos, S. Farahi, D. Psaltis and C. Moser, "High resolution lensless endoscope based on digital scanning through a multimode optical fiber", Biomed Opt Express 4, 260 (2013).

Nevertheless, these articles do not relate, as in the present invention, to the detection of an excitation by a fiber optic sensor capable of detecting very small perturbations.

The sensor of the invention comprises the combination of a fiber optic assembly possibly including a fiber that may advantageously be multimode as strain sensor and an adaptive interferometer based on digital holography, to detect a perturbation.

FIG. 1 schematically shows the principle of the invention in a first variant operating in transmission. A laser assembly SL delivers a laser beam, part of which is inserted into the fiber optic assembly OF and another part of which forms a reference beam Fr. According to this variant operating in transmission, the laser beam is inserted via the end referenced $E_2$ and exits from the fiber optic assembly at the end $E_1$, forming the signal beam Fs bearing the information relating to the excitation to be detected A. The beams Fr and Fs are split via a beam splitter Ls in order to be directed both in the direction of a video camera CA (beams $Fr_C$ and $Fs_C$) and in the direction of a liquid-crystal spatial light modulator SLM (beams $Fr_M$ and $Fs_M$).

The two basic main components are thus a video camera CA, possibly a CCD or CMOS video camera and a liquid-crystal spatial light modulator SLM and these components are placed symmetrically at 45° about a 50% beam splitter Ls, and precisely imaged one on the other.

Thus, the coherent optical waves, i.e. the reference and the signal bearing the speckle pattern to be demodulated (optical phase modulation at the frequency $\Omega$), are split by the beam splitter and superposed in order to interfere on the video camera CA.

The interference pattern obtained on the video camera is addressed electrically via a processing unit $UN_{CA}$ to the liquid-crystal spatial light modulator SLM (denoted LC SLM in the description below) in order to create the phase hologram that corresponds thereto.

This hologram allows the reference laser beam and the signal beam, which are incident directly on the LC SLM, to be diffracted. The signal diffracted in one of the diffraction orders is collected with a photodiode PD. Its frequency is that of the phase modulation in the fiber optic assembly. The amplitude of its intensity modulation is proportional to the amplitude of the phase modulation of the signal wave carried by the signal beam.

The reference and signal beams $Fr_M$ and $Fs_M$ are used to read the hologram thus inscribed. The $I_{-1}$ diffraction order of the reference beam $Fd_{rM}$ diffracted by the inscribed hologram and superposed on the 0 order of the transmitted laser beam of the signal $Ft_{SM}$ may in particular be analyzed.

Figure 2A:
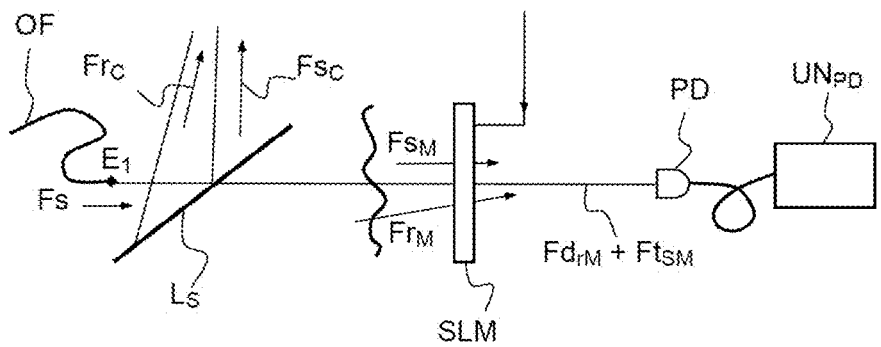
FIGS. 2a, 2b and 2c relate to the reading of the hologram inscribed in the liquid-crystal spatial light modulator used in the fiber optic sensor of the invention.

In the operating mode in FIG. 1, which is shown enlarged in FIG. 2a level with the LC SLM, the photodiode is placed level with the $I_{-1}$ diffraction order of the diffracted reference laser beam.

Mixing and interaction of optical waves in a multimode system has been described in the article by U. Bortolozzo, S. Residori and J. P. Huignard, "Beam-Coupling in Photorefractive Liquid Crystal Light-Valves", J. Phys. D: Appl. Phys. 41, 224007 (2008), in the context of light valves and also allows in the context of the present invention very small phase perturbations to be effectively measured.

Figure 2B:
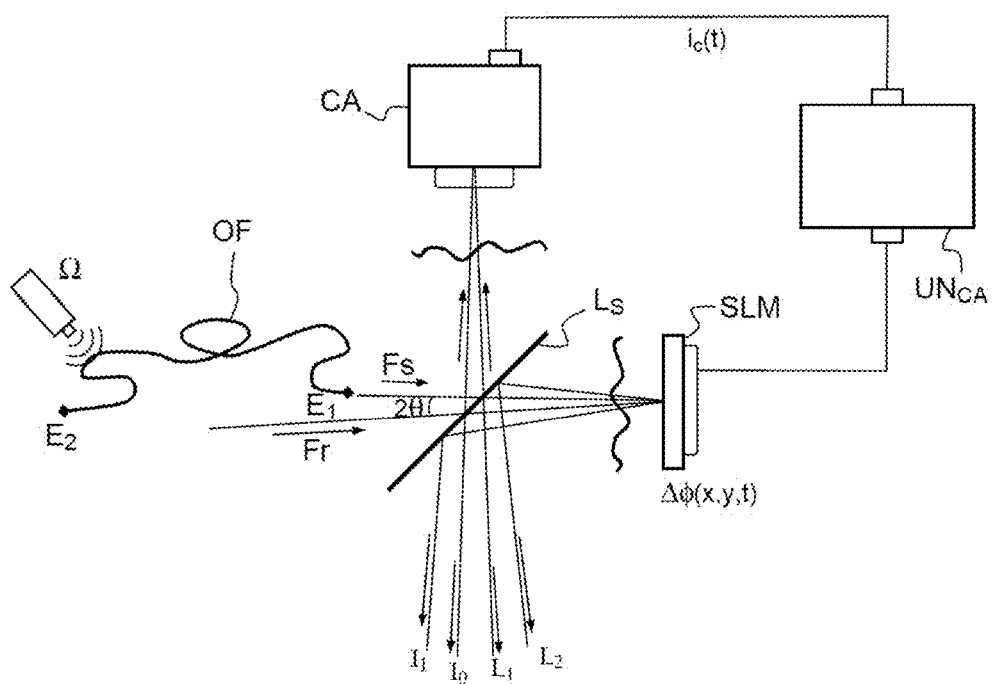

The liquid-crystal spatial light modulator may either operate in transmission, or in reflection as shown in FIG. 2b; according to this variant the liquid-crystal is passed through twice, thus producing a double phase shift, the signal beam and reference beam making therebetween an angle of $2\theta$ level with the SLM.

Figure 2C:
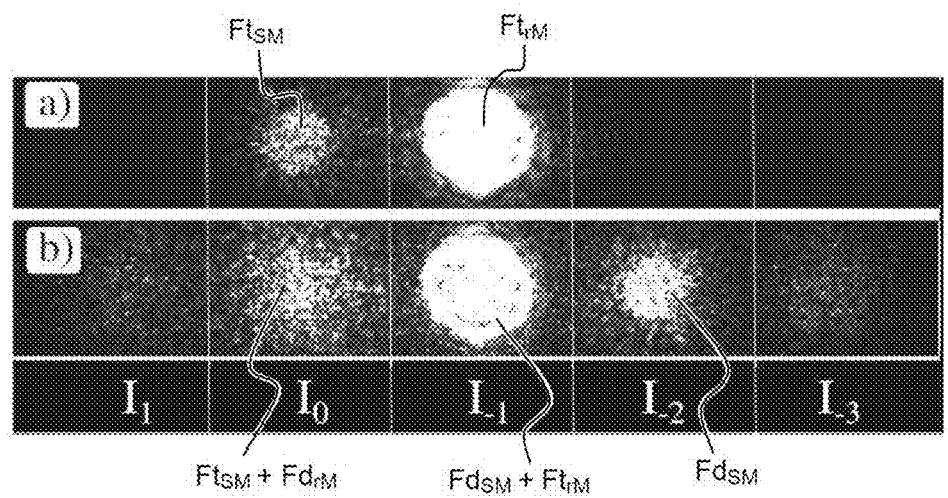

FIG. 2c illustrates the diffraction of the signal and of the reference on the digital hologram, for detectors capable of detecting various diffraction orders (orders: $I_1$, $I_0$, $I_{-1}$, $I_{-2}$, $I_{-3}$) in two different configurations:

case (a): the video camera is turned off, the signal beam and the reference beam are transmitted;
  the intensity of the signal laser beam $Ft_{sM}$ is detected in the $I_0$ order;
  the intensity of the beam $Ft_{rM}$ is detected in the $I_{-1}$ order;
case (b): the signal and reference laser beams are diffracted, the video camera is in operation allowing a diffraction hologram to be inscribed:
  the intensity of the transmitted signal beam $Ft_{sM}$ in the $I_0$ order and the intensity of the reference beam diffracted in this order, i.e. $Fd_{rM}$, are detected;
  the intensity of the diffracted signal laser beam $Fd_{sM}$ in the $I_{-1}$ order and
  the intensity of the transmitted reference laser beam $Ft_{rM}$ are detected;
  the intensity of the diffracted signal beam in this higher, $I_{-2}$ order is detected.

The total incident intensity is 0.4 mW/cm$^2$.

Figure 3:
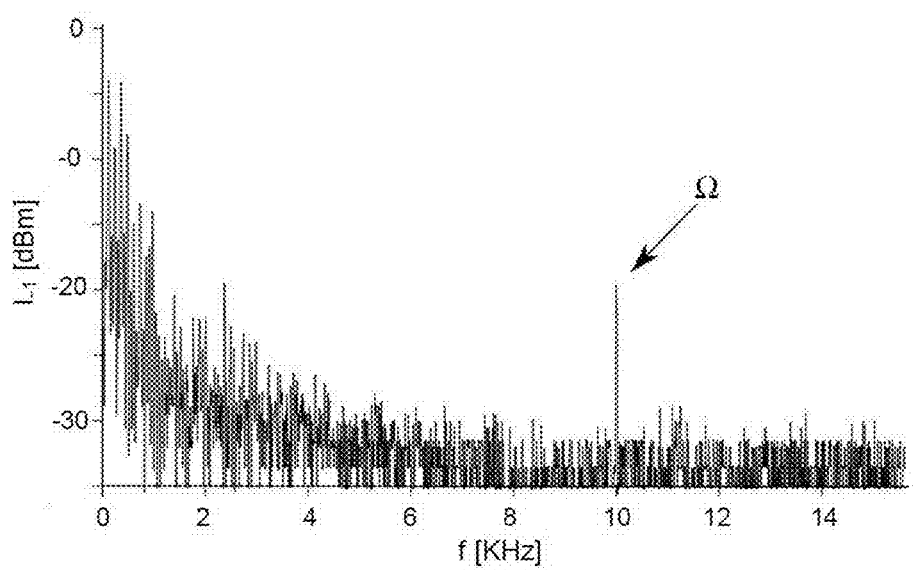
FIG. 3 illustrates one exemplary intensity spectrum detected with a fiber optic sensor of the invention in proximity to an acoustical excitation.

FIG. 3 illustrates a spectrum of the intensity detected in the −1 diffraction order, showing a phase modulation $\Omega$ at 10 kHz obtained with the following:
  a solid-state laser source used at a wavelength 532 nm;
  a 5 m multimode fiber (numerical aperture NA=0.2 and a core diameter of d=200 microns);
  a phase perturbation at the frequency 10 kHz with an amplitude of about 0.3 mrad induced in said optical fiber by a piezoelectric crystal;
  digital holography achieved with a CMOS video camera (Photonfocus A1312, 1312×1080 pixels, pixel size of 8 microns, 8 bit) and a liquid-crystal spatial modulator (HOLOEYE, PLUTO operating in reflection as shown in FIG. 2b, an integrated mirror being behind the liquid crystal);
  the image detected by the video camera is recorded by a computer and sent to the liquid-crystal spatial modulator;
  detection of the modulation in the −1 order with a silicon photodiode.

The fiber optic sensor of the invention may also operate according to the principal described above and in a Rayleigh backscatter mode, as schematically shown in FIG. 4. The Rayleigh backscattering occurs at the same wavelength as that of the incident photons. The photons scattered and guided in the opposite direction to the photons injected into the fiber bear the phase modulation experienced on the round-trip of the pulse, to the end of the fiber.

The laser assembly SL forms a source that is split via a two-channel coupler, one channel being dedicated to the reference wave carried by the reference beam and one channel being dedicated to the signal wave carried by the beam Fs output from the fiber optic assembly, after insertion at the end $E_1$ and propagation in the fiber optic assembly OF.

The sensor of the present invention may advantageously comprise means allowing the excitation to be located with respect to the extent of the fiber optic assembly defined between the two ends $E_1$ and $E_2$ when it functions in backscatter.

First Example

According to a first operating mode, shown in FIG. 5, the fiber optic sensor operates in a backscatter mode. The laser assembly forms a source that is split into two channels relating to two waves: a reference wave carried by the beam Fr, which is directed directly to the interferometer, and a signal wave that is temporally modulated and injected into the fiber then backscattered, this wave being carried by the signal beam Fs. The backscattered wave carries the phase modulation to be detected and interferes with the reference in the interferometer. The sequential arrival of the pulses allows the perturbation to be located. Since the speed v of propagation of the light wave in the optical fiber is known, measuring the duration dt of a round trip of a pulse makes it possible to determine at what distance Li in the fiber the latter was backscattered:

$$2 \times Li = v \times dt.$$

Second Example

Figure 6:
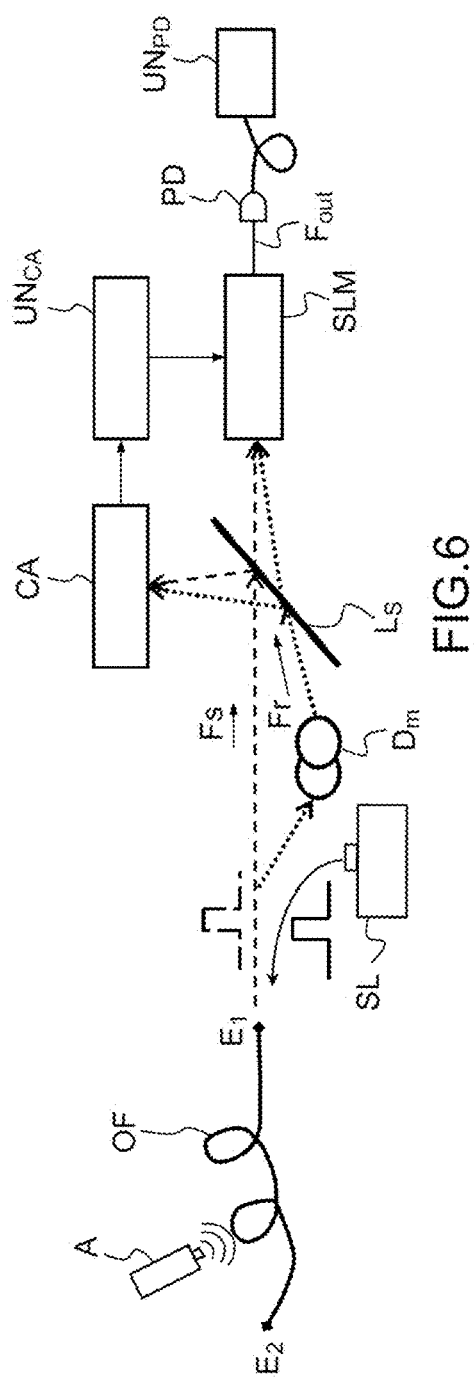
FIG. 6 schematically shows the principle of the invention in one variant fiber optic sensor for locating an excitation in proximity to a fiber optic assembly operating in backscatter with a modulated signal beam and a reference beam generated as output from the fiber optic assembly.

According to another operating mode, shown in FIG. 6, the fiber optic sensor can be exploited in a backscatter mode with a laser assembly that delivers a temporally modulated source that is transmitted to the fiber optic assembly OF. The backscattered wave carries the phase modulation to be detected. It is split into two channels, relating to two optical waves, via a coupler, a reference wave being carried by a reference beam to which a path difference of length L is added and a signal wave being carried by the signal laser beam Fs.

A path difference of length L generated by means $D_m$ is thus added between the two (signal and reference) channels. These means may typically consist of a segment of optical fiber.

The two channels are transmitted to the interferometer. The interference between the pulse and its delayed replica allows the phase shift undergone by the fiber over a distance corresponding to L/2 to be measured. The sequential arrival of the pulses allows the perturbation to be located.

Third Example

According to another operating mode, the fiber optic sensor may be exploited in a reflection mode, the fiber optic assembly OF being configured to integrate various wavelength-selective mirrors distributed along the fiber optic assembly.

The laser source assembly SL for its part forms a continuous-wave multi-wavelength source (possibly composed of a plurality of single-mode sources) emitting at wavelengths $\lambda_1, \ldots, \lambda_i, \ldots, \lambda_N$. The multi-wavelength $\lambda_i$ source is split into two channels: a reference channel including waves carried by the beams Fri, said waves being directed directly to the interferometer, and a channel intended for the waves carried by the signal beams Fsi output from the (single-mode or multimode) fiber optic assembly.

This fiber optic assembly is composed of N successive segments Ti indexed i, each segment comprising a selective reflecting device Mi able to reflect one associated emission wavelength $\lambda_i$, i.e. the reflection of which is centered on the wavelength $\lambda_i$. The reflecting devices are typically spaced apart by a distance d. Each segment of length d corresponds to a sensing portion of the sensor.

The indices i are referenced with respect to one end $E_1$ of the fiber assembly OF, which end is located on the side of the laser assembly: the segment $T_1$ reflecting the wavelength $\lambda_1$ corresponds to the first segment, i.e. the segment closest to the end $E_1$, and the segment $T_N$ reflecting the wavelength $\lambda_N$ corresponds to the last segment, i.e. the segment furthest from the end $E_1$.

According to one embodiment, each reflecting device Mi comprises a dichroic mirror. Preferably, in this case, the fiber optic assembly comprises N optical fibers $OF_1, \ldots,$ OFi, $\ldots, OF_N$, each fiber OFi and the associated dichroic mirror MDi corresponding to one segment Ti.

According to another embodiment, each reflecting device Mi comprises a Bragg reflector. Preferably, in this case, the fiber optic assembly OF is formed from a single fiber $OF_0$, the Bragg reflectors being integrated into the fiber $OF_0$ using recording means that are known in the prior art.

The sensor according to the invention furthermore comprises an optical system configured to provide an array of optical functions.

First of all, the optical system is configured to inject, via the end $E_1$ of the fiber optic assembly OF, the laser beams Fi emitted by the laser assembly SL, which will then propagate in the fiber. The beam $F_1$ of wavelength $\lambda_1$ passes through the first segment $T_1$ and is reflected from the reflecting device $M_1$. The other beams $F_2, \ldots, F_i, F_{i+1}, \ldots, F_N$ of wavelength $\lambda_2, \ldots, \lambda_i, \lambda_i+1, \ldots, \lambda_N$ pass through the second segment $T_2$. The segment $T_{i+1}$ is located between the mirror $M_i$ and the mirror $M_{i+1}$. The beam of wavelength $\lambda_2$ is reflected from the reflecting device $M_2$ and so on until the last beam of wavelength $\lambda_N$, which alone passes through the last segment $T_N$ and is reflected from the reflecting device $M_N$.

Figure 7:
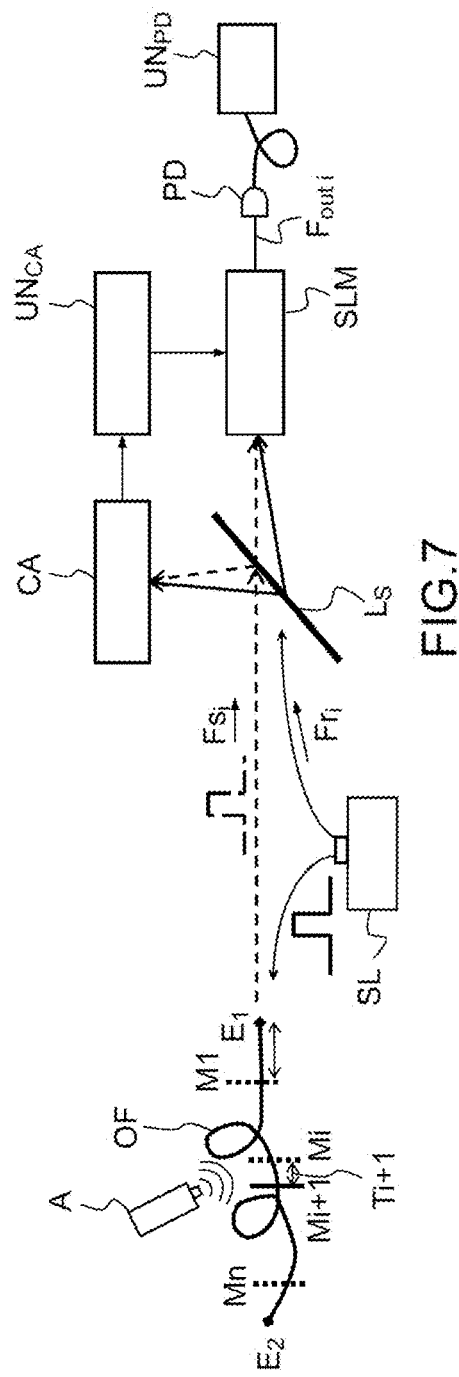
FIG. 7 schematically shows the principle of the invention in one variant fiber optic sensor for locating an excitation in proximity to a fiber optic assembly operating in reflection.

FIG. 7 schematically shows this variant, the beams Fsi and Fri being shown therein, each beam Fsi being reflected by one mirror $M_i$.

Thus, the fiber optic assembly receives, output from the end $E_1$, N signal beams Fsi indexed i of wavelength $\lambda_i$ output from the fiber optic assembly OF. Each signal beam Fsi is issued from the reflection from the reflecting means Mi, associated with the wavelength $\lambda_i$, of the laser beam Fi of wavelength $\lambda_i$ injected into then propagated in the various segments of the fiber optic assembly OF, as described above.

The optical system is also configured to generate N reference beams Fri indexed i of wavelengths $\lambda_i$, from the laser beam Fi of emission wavelength $\lambda_i$.

With the reference beams Fri and the signal beams Fsi, the optical system is configured to produce N interference zones Zi indexed i, each zone corresponding to the interference between one reference beam Fri and one signal beam Fsi of same emission wavelength $\lambda_i$. Thus an interference zone Zi corresponds to the interference between the reference beam Fri issued directly from the laser on the one hand, and the signal beam Fsi injected into and propagated in the fiber optic assembly on the other hand, both of wavelength $\lambda_i$. The interference of Fri and Fsi gives rise to a pattern of intensity fringes.

The N interference zones are separate, or adjacent, or partially overlap, or are located in the same spatial location.

The optical detector PD, typically a photodiode, is configured to detect the N output optical signals $F_{out}i$ indexed i diffracted by the N holograms Hi, respectively. The holograms Hi typically operate in a Raman-Nath diffraction regime, and various diffracted beams may be detected.

According to one embodiment, the optical detector is placed so as to detect, for each wavelength, the diffracted beam issued from the signal beam Fsi (in the same direction).

According to another embodiment, the optical detector is placed so as to detect, for each wavelength, the diffracted beam issued from the reference beam Fri (in the same direction).

According to another embodiment, the optical detector is placed so as to detect, for each wavelength, a diffracted beam of higher order.

The sensor includes a processing unit $UN_{PD}$ suitable for identifying the segment of the fiber assembly OF located in proximity to the excitation to be located. This identification is made on the basis of the N detected output optical signals. Specifically, each detected optical signal $F_{out}i$ carries information on the phase modulation $\Delta\phi$, which may result in temporal modulation of its intensity about a frequency equal to the central frequency of the phase modulation $\Delta\phi$.

This information is detected by the detector PD, then processed by the processing unit $UN_{PD}$ in order to identify the segment closest to the external excitation that induced the phase modulation in the fiber.

According to one embodiment, the processing consists in determining, among the N detected output optical signals ($F_{out}i$), the output optical signal of lowest index $k_1$ containing the phase modulation (i.e. an associated intensity modulation), the segment $T_{k1}$ to be identified corresponding to the segment having the index $k_1$.

Specifically, if the excitation occurs in proximity to the segment $T_1$ closest to the end $E_1$, all the optical signals $F_{out}i$ for all the wavelengths $\lambda i$ propagate through this segment, and are therefore modulated. The segment of lowest index is the segment $T_1$.

More generally, if the excitation occurs in proximity to the segment $T_{k1}$ of index $k_1$, only optical beams of indices higher than or equal to $k_1$ propagate through the segment $T_{k1}$, optical beams of lower index 1, . . . , $k_1-1$ having already been reflected from the corresponding reflecting devices M1, . . . , $Mk_1$. Thus, the segment $T_{k1}$ is identified. Thus, the fiber optic assembly OF structured into segments forms a distributed sensor, wavelength multiplexing allowing the segment located in proximity to the external excitation to be identified.

Fourth Example

According to another variant of the invention, the excitation is located by virtue of the use of a laser assembly SL forming a continuous-wave source that is frequency scanned periodically by means Bf that are for example able to perform direct modulation of the current of a laser diode or by an acousto-optical frequency translator, as schematically shown in FIG. 8a. The frequency cycle generates periodically a frequency that increases from 0 to $f_m$ over a period $t_m$.

The source is split into two channels: a reference channel corresponding to a wave carried by the reference beam Fr, which is in addition frequency shifted by $\Delta f$ by means Df, for example by an acousto-optical frequency translator or an electro-optical modulator, and directed toward the interferometer, and a channel issued from the laser beam inserted into the fiber optic assembly, and corresponding to a signal wave output from the (single-mode or multimode) fiber optic assembly. FIG. 8b illustrates the frequency f cycle applied to the reference beam and signal beam, said reference beam Fr being delayed by 2Li/c with respect to the signal beam Fs, where Li is the position of a plane R from which the signal wave is backscattered, said plane being referenced with respect to the end $E_1$ of the fiber optic assembly. FIG. 8b shows that:

$$\Delta f = 2Li f_m/(ct_m)$$

The backscattered wave carried by the signal beam Fs contains the phase modulation to be detected and interferes with the reference in the interferometer.

The frequency shift $\Delta f$ allows a hologram to be inscribed when the frequency of the reference arm coincides with the backscattered frequency, and therefore solely for one given backscattering plane. Location is therefore possible via variation of the value $\Delta f$. $\Delta f$ is varied as a function of time in the form $\Delta f = a \times t$ (a being the rate of variation in frequency). The value of $\Delta f$ that allows the "delay" seen by the wave injected into and then backscattered in the fiber therefore allows the inscription of a fixed pattern with the two waves and their diffraction in the liquid-crystal spatial modulator SLM. This known value of $\Delta f$ allows the distance Li at which the wave was backscattered to be determined:

$$\Delta f = a \times 2 \times Li/v.$$

Generally, the sensor according to the invention has many advantages. It is low-cost, stealthy and easily deployable.

Another advantage of the present invention is that the sensor has a very high sensitivity. Specifically one important feature of adaptive holography is that, for small modulations of phase amplitude $\Delta\phi$, the detection is always linear in $\Delta\phi$ and therefore the power measured in each output order is directly proportional to the amplitude of the phase modulation, and a direct measurement of $\Delta\phi$ may be achieved by placing a photodiode on one of the diffracted orders at the output of the liquid-crystal spatial light modulator.

Because of the linear character of the detection, small signals, which otherwise would be hidden by noise, may be measured (for example, if the detection is quadratic the slope of the measurement curve, which gives sensitivity, is substantially smaller). In addition, sensitivity is also increased because of the large phase shift produced by the liquid-crystal spatial light modulator as a function of the variations in intensity.

Fifth Example

Figure 9:
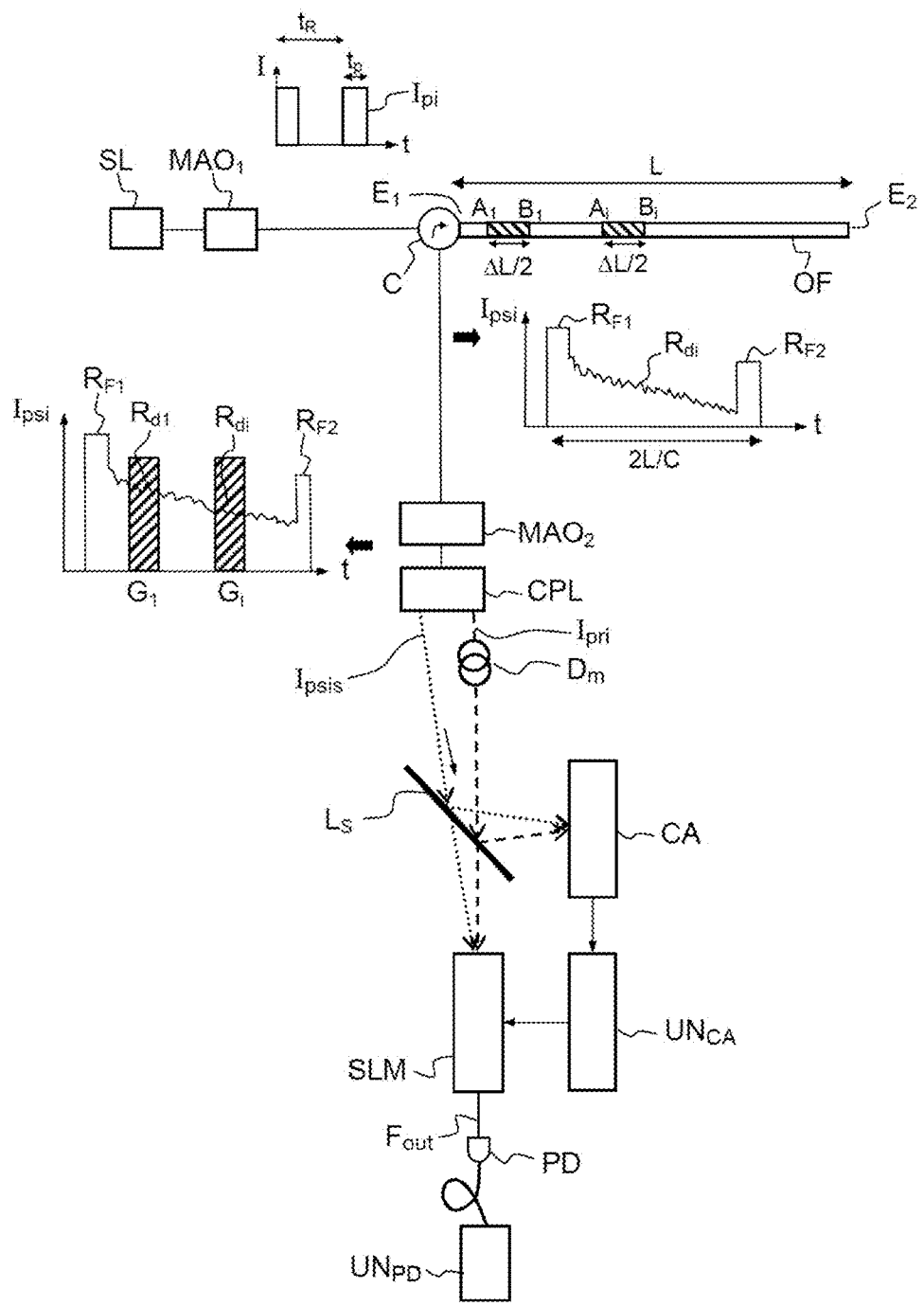
FIG. 9 illustrates an exemplary embodiment of a fiber optic sensor for locating an excitation in proximity to a fiber optic assembly operating in backscatter with a modulated signal beam and a reference beam generated as output from the fiber assembly.

This example relates to the production of a distributed fiber optic sensor allowing a perturbation to be located:

According to the exemplary configuration illustrated in FIG. 9, the distributed fiber optic sensor comprises a laser source SL, an acousto-optical modulator $MAO_1$ that generates optical pulses $I_{pi}$ that are emitted every $t_R$ and of pulse duration $t_p$, and an optical fiber OF of length L. A series of light pulses $I_{pi}$ of duration $t_p$ are thus injected into said optical fiber via a first end $E_1$, are propagated along said optical fiber, are reflected at the second end $E_2$, and then backscattered along said fiber; they correspond to the output optical pulses $I_{psi}$ that are exploited and carry information, as illustrated in FIG. 9. Various what are called sensing zones are probed; they are shown in the optical fiber between the positions $A_1$ and $B_1$, and between the positions $A_i$ and $B_i$.

Thus, a pulse inserted into the optical fiber OF of length L, via a circulator C, gives rise to a wave backscattered during all the duration of the round-trip of the pulse in the fiber, i.e. during a duration of 2×L/c. FIG. 9 shows the light intensity of an output pulse $I_{psi}$ generated by the backscatter $R_d$, the reflection $R_{F1}$ by the first end and the reflection $R_{F2}$ by the second end.

A second acousto-optical modulator $MAO_2$ is provided at the output of the circulator C, as is a coupler CPL in order to divide the output pulses into two channels. Means Dm allowing a length delay ΔL corresponding to the time taken by the light to make the round-trip through the sensing zone ΔL/2 are inserted into one of the two channels. This delay allows, on the video camera CA and the liquid-crystal spatial light modulator SLM, interference to be created between a wave and itself shifted in time.

This time shift corresponds to a distance shift of length ΔL/2 in the sensor. The wave that passes through the delayed channel originates from the position $A_i$ in the fiber, and the wave that passes through the non-delayed channel originates from the position $B_i$ in the fiber, which is located ΔL/2 further on in the sensor.

Interference of the backscatters originating from the positions $A_i$ and $B_i$ gives the phase difference between the backscatter coming from $A_i$ and the backscatter coming from $B_i$. It is a question of the phase seen by the wave issued from the position $B_i$ over the length ΔL/2. The decorrelation between the interference patterns corresponding to the N sensing zones in the sensor increases as sensing zone length increases.

Since the relative phase of N interference patterns is random, their superposition may decrease contrast and blur the fringes. This is why an acousto-optical modulator $MAO_2$ may be inserted before the point where the backscatter is split into two channels by a coupler CPL. It allows a window of 2×ΔL duration to be opened in order to let interfere only waves originating from one sensing zone at a time.

FIG. 9 thus also shows that interrogation may be performed by opening two windows $G_1$ and $G_i$ that are shifted in time, and that relate to various emission optical pulses $I_{pi}$.

In this case, one of the two channels serves as a reference with reference output optical pulses $I_{pri}$ and the other channel serves as a signal channel carrying signal optical pulses $I_{psiS}$, all of which pulses are issued from output optical pulses $I_{psi}$, the optical waves of the two channels interfere at the video camera and at the liquid-crystal spatial light modulator SLM.

This architecture allows, along the fiber, the phase perturbation induced by the physical quantity to be measured to be located with a spatial resolution of ΔL/2. It is measured by analyzing the frequency of the electrical signal delivered by the photodiode PD.

The maximum time between interrogation of two different sensing zones of the sensor is limited by the "turn-off" response time of the liquid crystals: i.e. $t_{off}$, the reset time of the liquid crystals, in the liquid-crystal spatial light modulator SLM, this implying that the time between two successive pulses defined by the parameter $t_R$ must be greater than the parameter $t_{off}$.

It is recommended to wait until the liquid crystals involved in the inscription of the interference pattern of the first sensing zone are once again available.

Sixth Example

This exemplary embodiment comprises a distributed architecture based on the use of a dynamic Brillouin grating as a mobile reflector and of an optical interrogation wave comprising a series of optical pulses.

The Brillouin grating, which is generated by the interaction between two optical pulses, allows a sensing optical-fiber section to be defined. In this case, the frequency aspect of the stimulated Brillouin interaction is not of interest but only the reflection coefficient of the dynamic grating. A probe wave then allows the optical fiber to be probed.

Figure 10A:
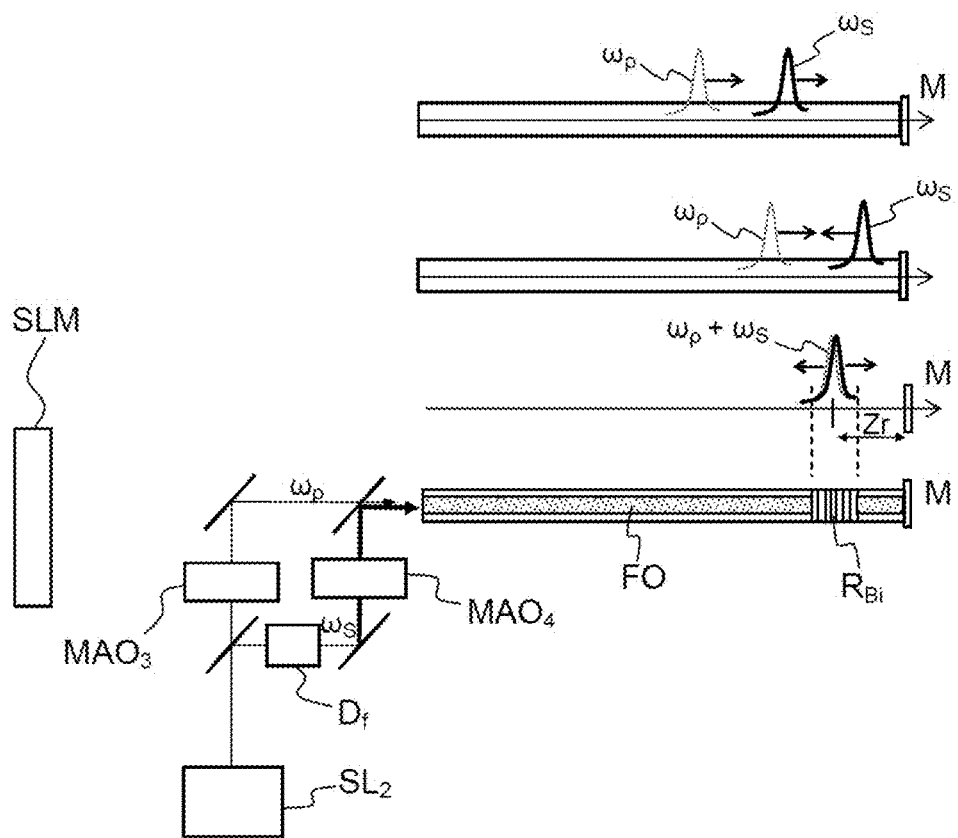
FIGS. 10a to 10c relate to an exemplary embodiment of a fiber optic sensor for locating an excitation in proximity to a fiber optic assembly operating in backscatter based on a dynamic Brillouin grating.
Figure 10B:
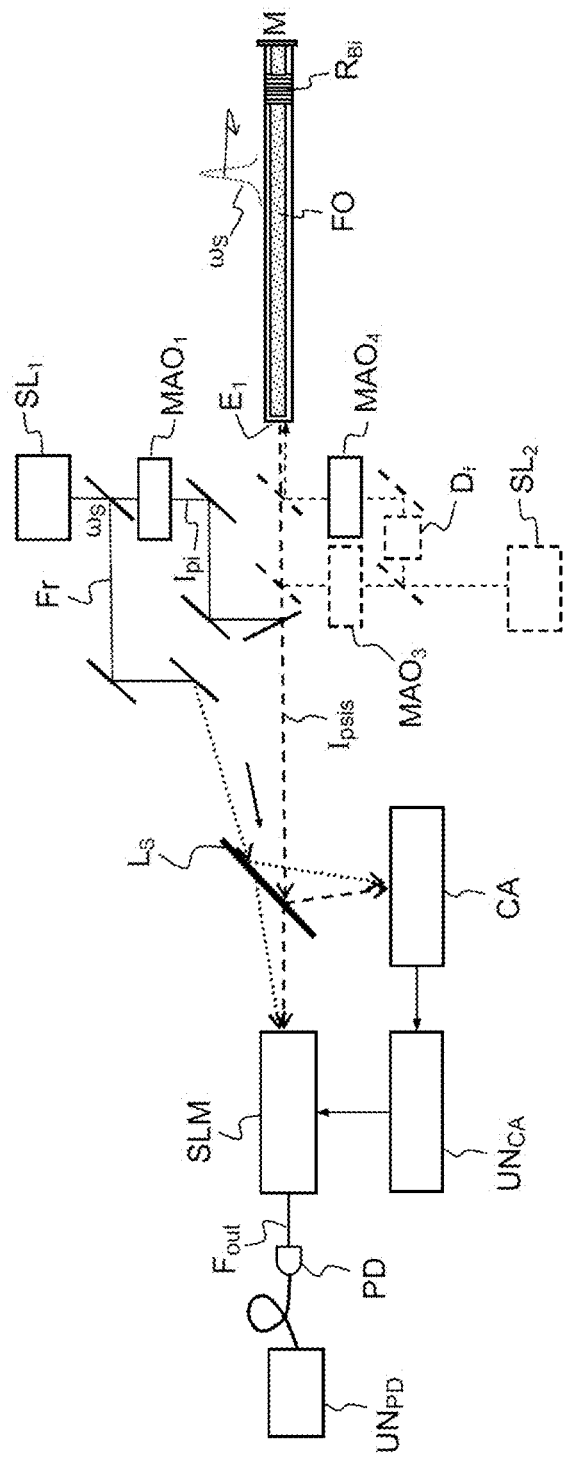

The proposed architecture is schematically shown in FIGS. 10a and 10b.

FIG. 10a illustrates the means required for the step of writing the Brillouin grating $R_{Bi}$. Two pulses issued from the same laser $SL_2$ of optical frequency $\omega_p$ but shifted in time and spectrally inscribe a Bragg grating by stimulated Brillouin scattering $R_{Bi}$. Thus, on the basis of a single laser source $SL_2$, provision is made, after the laser beam has been split, for two acousto-optical modulators $MAO_3$ and $MAO_4$ and for frequency shifting means Df that may be electro-optical, in order to generate two series of optical pulses at the optical frequencies $\omega_p$ and $\omega_s$ (the wave at the frequency $\omega_p$ is represented by the thin line, the wave at the frequency $\omega_s$ being represented by the thick line). Typically, the maximum length of the optical fiber L is limited to half the coherence length $L_{coh}$ of the laser used.

The Stokes wave is shifted toward low frequencies by $\omega_B$, the Brillouin frequency, corresponding to the Doppler effect: reflection of the pump from a mobile grating. This grating, equivalent to a Bragg grating (due to the electrostriction effect between the pump wave and the Stoke wave in silica) propagates in the same direction as the pump at the speed of sound $c_{ac}$ in the fiber $\omega_B = 2nc_{ac}/\lambda$.

The duration of the pulses determines the length of the grating. The grating is inscribed in succession at various positions $Z_r$ in the fiber.

Its position (i.e. the zone in the fiber where the reflection of the pulse at ωs crosses the pulse at ωp) is controlled by the time interval Δt between the two pulses. In practice, it is proposed to use a reflective treatment M at the end of the fiber in order to obtain the reflection of the wave at ωs, allowing the Brillouin scattering to be stimulated.

Thus, in the first channel, the first acousto-optical modulator $MOA_3$ is used to obtain the pump pulses. In the second channel, the frequency of the laser is shifted by a value corresponding to $\omega_B$ ($\omega_s = \omega_p - \omega_s$) i.e. about 10 GHz in optical fibres, then another acousto-optical modulator $MAO_4$ is used to obtain the Stoke pulses.

FIG. 10b illustrates the means required in the phase-reading step, which consists in using this Brillouin grating $R_{Bi}$ as a Bragg mirror.

A "probe" third wave issued from the optical assembly comprising a laser $SL_1$ is injected into the fiber at a frequency $\omega_s$ and makes a round-trip between the input of the fiber and the Brillouin grating $R_{Bi}$. It accumulates a phase shift on this round-trip.

This phase shift is the signal of interest. A hologram is generated on the liquid-crystal spatial light modulator SLM and on the video camera between the return of the probe and a reference originating from the same laser. An optical assembly is used comprising a laser $SL_1$ that emits a laser beam, divided to generate a laser beam $F_r$, the other portion of said beam being inserted into an acousto-optical modulator to generate a series of pulses $I_{pi}$ at the optical frequency $\omega_s$ in order to carry out the reading step. Typically, the lifetime of the grating thus inscribed is defined by the lifetime of the acoustic phonons in the material of the optical fiber, which may as is conventionally the case be silica, i.e. about 10 ns. It is therefore necessary to read the phase in the 10 ns following the writing. The pulses $I_{pi}$ inserted into the optical fiber generate, on output from the fiber, pulses $I_{psiS}$ after reflection from the Brillouin grating $R_{Bi}$, these interfering with the reference beam on the video camera and SLM.

Figure 10C:
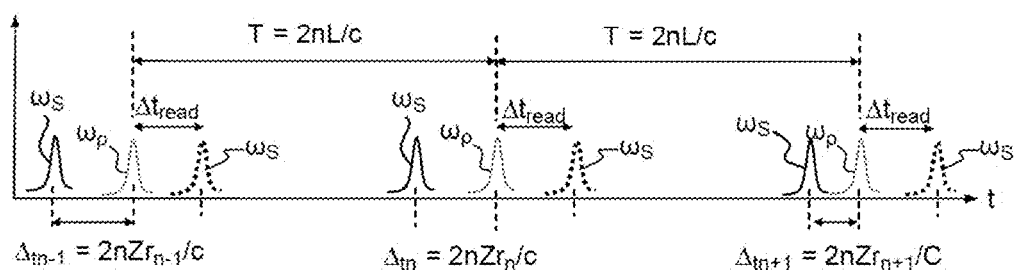

FIG. 10c illustrates the alternation of writing steps and of reading steps, corresponding to variations in the inscription of Brillouin gratings $R_{Bi}$ at various locations in the optical fiber. The position of the Brillouin grating $R_{Bi}$ in the fiber is regulated by the time shift between two writing pulses at the frequencies $\omega_p$ and $\omega_s$.

In each reading-writing cycle, the spectrum obtained in the cycle N is subtracted from the spectrum obtained in the cycle N+1 in order to access the information that is generated in the fiber section corresponding to the (read/write) interrogation by the pulses of the cycle N.

The period of the reading-writing process is:

$$T = 2L/c = 1/f_{rep}.$$

The spectrum $Si(t, L-Z_r)$ of the signal perturbing the phase at $ti = i*T$, for the Brillouin reflector $R_{Bi}$ at the position $L-Z_{ri}$, is obtained. More precisely, $Si(t, L-Z_r)$ is the spectrum of the acoustic signal that modulates the phase in a return trip between the input of the fiber and the inscribed Brillouin reflector $R_{Bi}$, and therefore over the length $2 \times L - Z_{ri}$.

The invention claimed is:

1. A fiber optic sensor for detecting an excitation in proximity to a fiber optic assembly, said excitation inducing a modulation of the phase of an optical signal propagating in said fiber optic assembly, said sensor comprising:
   a laser assembly of at least one first laser, said laser assembly being configured to emit at least one first laser beam;
   the fiber optic assembly having a first end and a second end;
   an optical system configured to:
      inject via said first or said second end, at least one portion of said first laser beam;
      receive via said first end, at least one signal beam issued from the portion of the first laser beam injected into and propagated in said fiber assembly;
      generate at least one reference beam from said first laser beam or said signal beam;
      produce at least one interference zone corresponding to the interference between a portion of the reference beam and a portion of the signal beam;
   a digital holography assembly comprising:
      a liquid-crystal spatial light modulator configured to receive a portion of the signal beam and a portion of the reference beam;
      a video camera configured to receive said interference zone generating an interference pattern, said interference pattern being addressed electrically to said liquid-crystal spatial light modulator in order to create thereon a phase hologram corresponding thereto;
   at least one optical detector configured to detect an output optical signal beam resulting from:
      the diffraction of said portion of the signal beam and/or said portion of the reference beam received by the hologram inscribed in said liquid-crystal spatial light modulator and
      the transmission of said portion of the reference beam and/or said portion of the signal beam transmitted by said liquid-crystal spatial light modulator;
   a first processing unit, connected to the output of said optical detector, for processing said output optical signal beam, allowing information relative to said excitation to be extracted.

2. The fiber optic sensor as claimed in claim 1, wherein the fiber optic assembly is multimode.

3. The fiber optic sensor as claimed in claim 1, further comprising a acousto-optical modulator for generating optical pulses from said first laser.

4. The fiber optic sensor as claimed in claim 1, wherein a beam splitter splits the signal beam and the reference beam into two portions, a first portion of said beams being directed to said video camera, the second portion of said beams being directed to the liquid-crystal spatial light modulator.

5. The fiber optic sensor as claimed in claim 1, comprising a second processing unit for processing on output from said video camera said interference pattern and for addressing it to said liquid-crystal spatial light modulator.

6. The fiber optic sensor as claimed in claim 1, wherein the signal beam received by said first end is issued from a beam inserted at said second end and propagated in transmission in said fiber optic assembly.

7. The fiber optic sensor as claimed in claim 1, wherein the signal beam received by said first end is issued from a beam inserted at said first end and backscattered in said fiber optic assembly.

8. The fiber optic sensor as claimed in claim 7, further comprising at least:
   a circulator positioned:
      at the output of said optical assembly comprising said at least one first laser; and
      at the input of the fiber optic assembly; and
      at the input of said liquid-crystal spatial light modulator;
   a coupler located at the output of said fiber optic assembly for creating two optical channels carrying output optical pulses;
   means for delaying said output pulses of said fiber optic assembly in one of said two channels so as to create a signal channel carrying signal optical pulses and a reference channel carrying reference optical pulses in order to generate said interference zones on said spatial light modulator.

9. The fiber optic sensor as claimed in claim 8, further comprising:
   a acousto-optical modulator located at the output of the circulator and at the input of the coupler allowing windows of duration $2\Delta L/c$, where c is the speed of light in free space and $\Delta L/2$ is the length of a sensing zone defined between a position $A_i$ and a position $B_i$ in said fiber optic assembly and referenced from said first end, to be selected in order to let interfere only backscattered waves originating from a sensing zone of said fiber at the same time;
   means for delaying said output pulses introducing an additional length to be traced $\Delta L$;
   the pulses being separated by a duration $t_R$, such that $t_R > 2L/c$, the duration of said pulses $t_p$ being $t_p > \Delta L/c$ and $t_R > t_{off}$ where $t_{off}$ is the response time of the liquid crystals.

10. The fiber optic sensor as claimed in claim 7, further comprising:
   a writing laser assembly comprising at least one second laser emitting a series of writing pulses at a pump frequency $\omega_p$ and a second laser beam emitting a series of writing pulses at a signal frequency $\omega_s$ that is different from the frequency $\omega_p$;

the optical system being configured:
   to inject via said first end said series of writing pulses at the frequencies ωp and ωs, inscribing at least one Brillouin grating element in said optical fiber; and
   to inject said series of pulses issued from said optical assembly including at least one third laser emitting at a wavelength λs corresponding to a read laser beam at said signal frequency ωs;
   the position at which said Brillouin grating element is written being referenced with respect to the second end of said fiber and being regulated by the time shift between two writing pulses at the frequencies $\omega_p$ and $\omega_s$.

11. The fiber optic sensor as claimed in claim 10, wherein the writing laser assembly comprises:
   means for dividing said beam into two channels;
   means for shifting the pump frequency $\omega_p$ to a signal frequency $\omega_s$ in one of the channels;
   means for generating pulses in the two frequency-shifted optical channels, possibly acousto-optical modulators.

12. The distributed fiber optic sensor as claimed in claim 11, wherein said optical system is configured so that said reference beam or said reference pulses interfere, on being input into said liquid-crystal modulator without having been injected into said fiber optic assembly, with said signal optical pulses issued from said optical pulses injected into then propagated in said fiber.

13. The distributed fiber optic sensor as claimed in claim 11, wherein said optical system is configured so that said reference beam or said reference pulses interfere, on being input into said liquid-crystal modulator after having been injected into said fiber optic assembly, with said signal optical pulses issued from said optical pulses injected into then propagated in said fiber.

14. The fiber optic sensor as claimed in claim 7, comprising:
   said laser assembly emitting a continuous-wave laser beam at a frequency f;
   means for performing a periodic frequency scan of said frequency f in a frequency band [0, $f_m$] so as to code backscattering planes corresponding to lengths referenced with respect to one end of said fiber optic assembly;
   means for obtaining a shift Δf in the frequency of the reference laser beam so as to inscribe a hologram in said liquid-crystal spatial light modulator when the frequency of the reference beam coincides with the frequency of the signal laser beam;
   said processing unit suitable for identifying the position of a backscattering plane referenced with respect to one end of said fiber optic assembly.

15. The fiber optic sensor as claimed in claim 1, wherein a first portion of the first laser beam is temporally modulated before being inserted into the fiber optic assembly, a second portion of the first laser beam forming the reference laser beam without being temporally modulated, the sequential arrival of the pulses allowing the location of said excitation level with the fiber optic assembly.

16. The fiber optic sensor as claimed in claim 1, wherein the reference beam is generated from said signal beam output from said first end and comprises means for creating a path difference in said reference beam.

17. The fiber optic sensor as claimed in claim 1, comprising:
   said laser assembly configured to emit N laser beams indexed i with i>1 of respective wavelength $\lambda_i$;
   said fiber optic assembly including N successive segments indexed i, each segment comprising a device for selectively reflecting an associated emission wavelength λi, the indices being referenced with respect to one end of said fiber optic assembly;
   the optical system generating N reference beams indexed i of emission wavelength λi from a laser beam and producing N interference zones indexed i, each zone corresponding to the interference between a reference beam and a signal beam of same emission wavelength λi;
   said at least one optical detector being configured to detect N output optical signals indexed i and respectively diffracted by said N holograms;
   said processing unit suitable for identifying the segment of said fiber assembly located in proximity to said excitation to be located, from the N detected output optical signals.

18. The fiber optic sensor as claimed in claim 1, wherein said spatial light modulator is configured to operate in reflection.

* * * * *

UNITED STATES PATENT AND TRADEMARK OFFICE
CERTIFICATE OF CORRECTION

PATENT NO. : 10,126,163 B2
APPLICATION NO. : 15/541332
DATED : November 13, 2018
INVENTOR(S) : Jean-Pierre Huignard et al.

Page 1 of 1

It is certified that error appears in the above-identified patent and that said Letters Patent is hereby corrected as shown below:

In the Claims

In Claim 14, Column 17, Line 40, "fin a" should be --f in a--.

Signed and Sealed this
Twenty-fifth Day of December, 2018

Andrei Iancu
*Director of the United States Patent and Trademark Office*